United States Patent
Cowley et al.

(10) Patent No.: US 8,744,877 B2
(45) Date of Patent: Jun. 3, 2014

(54) METHODS AND SYSTEMS FOR PROVIDING GMWB HEDGING AND GMDB REINSURANCE

(75) Inventors: Alex Cowley, Ridgefield, CT (US); Craig Sabal, New York, NY (US); Dmitry Noraev, New Providence, NJ (US); Doug McBeth, Guttenberg, NY (US); Llewellyn C. Connolly, Leesburg, VA (US); Martin Klein, Far Hills, NJ (US); Pradip Ghosh, New York, NY (US); Russ Hackman, Larchmont, NY (US)

(73) Assignee: Barclays Capital Inc., New York, NY (US)

( * ) Notice: Subject to any disclaimer, the term of this patent is extended or adjusted under 35 U.S.C. 154(b) by 1527 days.

(21) Appl. No.: 11/213,042

(22) Filed: Aug. 25, 2005

(65) Prior Publication Data

US 2006/0122871 A1 Jun. 8, 2006

Related U.S. Application Data

(60) Provisional application No. 60/604,603, filed on Aug. 26, 2004.

(51) Int. Cl.
*G06Q 40/00* (2012.01)
(52) U.S. Cl.
USPC ................................. 705/4; 705/35
(58) Field of Classification Search
USPC ................................................. 705/4, 35
See application file for complete search history.

(56) References Cited

U.S. PATENT DOCUMENTS

| | | | | |
|---|---|---|---|---|
| 7,249,083 B2 * | 7/2007 | Noraev et al. | ........... | 705/36 R |
| 7,558,757 B2 * | 7/2009 | Conroy et al. | ........... | 705/38 |
| 7,747,518 B2 * | 6/2010 | Caballero et al. | ........... | 705/38 |
| 7,801,748 B2 * | 9/2010 | Bonissone et al. | ........... | 705/4 |
| 2002/0107858 A1 | 8/2002 | Lundahl et al. | | |
| 2003/0088430 A1 | 5/2003 | Ruark | | |
| 2004/0030625 A1 | 2/2004 | Rabson et al. | | |
| 2004/0177022 A1 * | 9/2004 | Williams et al. | ........... | 705/36 |
| 2004/0230519 A1 * | 11/2004 | Parker | ........... | 705/37 |
| 2005/0086156 A1 * | 4/2005 | Conroy et al. | ........... | 705/38 |
| 2005/0261943 A1 * | 11/2005 | Quarterman et al. | ........... | 705/4 |

OTHER PUBLICATIONS

Moshe Arye Milevsky and Steven E. Posner, "The Titanic Option: Valuation of the Guaranteed Minimum Death Benefit in Variable Annuities and Mutual Funds"; Journal of Risk and Insurance, vol. 68, No. 1, (Mar. 2001), pp. 93-128.

* cited by examiner

*Primary Examiner* — Lalita M Hamilton
(74) *Attorney, Agent, or Firm* — Morgan Lewis & Bockius LLP

(57) ABSTRACT

In one aspect, the invention comprises computer processors operable to identify a block of idealized policies, computer processors operable to calculate risk related to the block of idealized policies based on specified actuarial assumptions; and computer processors operable to provide a customized option designed to pay guaranteed minimum withdrawal benefits on the block of idealized policies; wherein the block of idealized policies is designed to replicate a current policy mix of an insurance company. In another aspect, the invention comprises computer processors operable to identify a block of idealized policies, computer processors operable to calculate risk related to the block of idealized policies based on specified actuarial assumptions; and computer processors operable to provide a reinsurance contract designed to pay guaranteed minimum death benefits on the block of idealized policies; wherein the block of idealized policies is designed to replicate a current policy mix of an insurance company.

4 Claims, 3 Drawing Sheets

METHODS AND SYSTEMS FOR PROVIDING GMWB HEDGING AND GMDB REINSURANCE

CROSS-REFERENCE TO RELATED APPLICATIONS

This application claims the benefit of U.S. Provisional Application No. 60/604,603, filed Aug. 26, 2004. The entire contents of the above application are incorporated herein by reference.

BACKGROUND

An annuity is a contract issued by an insurance company and has two phases: an accumulation phase, during which the contract builds a cash value and money is added, and a payout phase, during which the funds are distributed. Variable annuities typically offer single or flexible premiums, a broad range of subaccounts, tax deferral on earnings, and, more recently, death and living benefits. Values change according to the performance of the subaccounts, which typically are invested in mutual funds.

A popular feature of variable annuity ("VA") contracts is a Guaranteed Minimum Withdrawal Benefit (GMWB). The purpose of the GMWB is to provide a guaranteed level of income to the policy holder. The policy holder has the right to withdraw a specified percentage (e.g., seven percent) of an initial deposit every year until the entire principal is returned. For example, assume an investor invests $100,000 in a contract with a GMWB feature. The $100,000 is placed in an investment account that invests in mutual funds. Assuming a seven percent withdrawal allowance, the policy holder could withdraw $7,000 each year until the total withdrawn reaches $100,000. This would take just over 14 years. Note the policy holder can withdraw the funds irrespective of how the investment account performs. The policy holder's income stream is protected, regardless of market performance. If the market performs poorly, the policy holder receives the guaranteed annual withdrawal of $7,000. At the end of the 14 years, the policy holder's guarantee would be exhausted and the policy would continue as a non-GMWB VA policy.

The reporting and risk management of this feature provides some interesting challenges. SFAS 133 is a statement issued by the Financial Accounting Standards Board ("FASB"), which establishes accounting and reporting standards for derivative instruments, including certain derivative instruments embedded in other contracts, (collectively referred to as derivatives) and for hedging activities. It requires that an entity recognize all derivatives as either assets or liabilities in the statement of financial position and measure those instruments at fair value. Under SFAS 133, a GMWB is classified as a derivative, and should be marked to market under the same methodology as other equity options.

Various strategies are being employed to risk manage GMWB blocks: (a) Delta Hedging with Equity and Bond Futures—not very effective since a GMWB's exposure to "vega" (implied volatility) is not hedge-able with futures, and substantial EPS (earnings per share) and economic risks remain; (b) Delta Hedging and Equity Vanilla Options—reasonably effective to hedge economic and EPS exposure over intermediate term and stable markets, but long term effectiveness is unlikely due to cost and exposure to second and third order risks; and (c) Delta Hedging and Exotic Equity Options—less expensive and reasonably effective to hedge accounting and EPS exposure over intermediate term and stable markets, but long term effectiveness is not well understood.

Another common feature of VA contracts is the Guaranteed Minimum Death Benefit ("GMDB"), which typically guarantees that a certain amount will be paid to a beneficiary in the event that the policy holder dies. If the policy holder dies at a time when the aggregate value of the subaccounts is less than the guaranteed value, the insurance company pays out the amount of any shortfall.

Various risk management strategies are being tried regarding GMDBs: (a) Delta Hedging with Equity and Bond Futures—reasonably effective over short term and stable markets, but substantial exposure remains to market gaps and hedge accounting is very difficult to achieve; (b) Delta Hedging and Equity Vanilla Options—effective over intermediate horizon and stable markets, but long term effectiveness is not well understood and hedge accounting is very difficult to achieve; (c) Delta Hedging and Exotic Equity Options—effective over intermediate horizon and stable markets; but long term effectiveness is not well understood and hedge accounting is very difficult to achieve.

SUMMARY

Some goals of the present invention are to provide an investment strategy that: (1) matches the long dated exposure of the GMWB/GMDB liability; (2) achieves significant risk transfer to a third party; (3) may reduce potential financial reporting mismatch between hedge assets and liability; (4) entails less operational risk; (5) has less exposure to rollover risk (from the change in the cost of hedging instruments); (6) may generate significant statutory capital benefits.

Many of the above goals are achieved by the systems and methods of the present invention ("The Hedge"). As illustrated in FIG. 1, a customized static strategy (the Hedge) and a dynamic strategy are diametrically opposed approaches to managing risk. The Hedge relates to a derivative that pays out claims (on GMWB or GMDB policies) on an "idealized" block of policies invested in trade-able indices.

In various aspects, the invention provides a hedge designed to risk manage an insurance guarantee embedded in an insurance company variable annuity. In one aspect, the invention comprises hedging with highly exotic options that replicate a VA guarantee such as a GMWB. A highly structured option can provide economic advantages over dynamic strategies.

In another aspect, the invention comprises systems and methods for providing GMDB reinsurance. In one embodiment, the invention comprises capital markets based reinsurance. In this embodiment, capital markets participants bear some actuarial risk, and GAAP reinsurance accounting may be achievable.

In another aspect, the invention comprises a system comprising: one or more computer processors operable to identify a block of idealized policies, one or more computer processors operable to calculate risk related to the block of idealized policies based on one or more specified actuarial assumptions; and one or more computer processors operable to provide a customized option designed to pay guaranteed minimum withdrawal benefits on the block of idealized policies; wherein the block of idealized policies is designed to replicate a current policy mix of an insurance company.

In various embodiments: (1) the block of idealized policies is originated on a specified date; (2) the block of idealized policies is invested in one or more market indices as specified in one or more asset allocations; (3) the block of idealized policies is designed to perform with one or more fixed/function-based actuarial assumptions for one or more of: withdrawals, fees, resets, and lapses; (4) insurance company retains basis risk between one or more market indices and actual performance; (5) the insurance company retains risk that actual experience will differ from the one or more actuarial assumptions; and (6) the option is designed to match the life of the block of idealized policies.

In another aspect, the invention comprises one or more computer processors operable to identify a block of idealized policies, one or more computer processors operable to calculate risk related to the block of idealized policies based on one or more specified actuarial assumptions; and one or more computer processors operable to provide a reinsurance contract designed to pay guaranteed minimum death benefits on the block of idealized policies; wherein the block of idealized policies is designed to replicate a current policy mix of an insurance company.

In another aspect, the invention comprises a system for providing one or more variable annuity policies with guaranteed minimum death benefits, comprising: one or more computer processors operable to calculate one or more reinsurance premiums for one or more reinsurance agreements related to the one or more variable annuity policies with guaranteed minimum death benefits; wherein the one or more reinsurance premiums are to be paid by an insurance company to a reinsurer, wherein the one or more reinsurance agreements transfer at least some equity market risk and at least some actuarial risk to the reinsurer from the insurance company, and wherein the one or more reinsurance agreements cap potential loss due to the guaranteed minimum death benefits at a specified level per period for the term of each of the agreements.

In various embodiments: (1) the premiums are to be paid upfront; (2) the premiums are to be paid on an ongoing basis; (3) the premiums are calculated based on pricing assumptions selected from the group consisting of: (a) mortality, as provided by the insurance company; (b) fees, as provided by the insurance company; (c) lapses, as provided by the insurance company (d) whether reinsurer assumes lapse risk; and (e) whether reinsurer assumes limited mortality risk; (4) at least one of the one or more reinsurance agreements is a quota share modified coinsurance agreement or a stop loss reinsurance agreement; and (5) at least one of the one or more reinsurance agreements comprises one or more terms related to a lapse rate threshold.

DETAILED DESCRIPTION OF PREFERRED EMBODIMENTS

Figure 1:
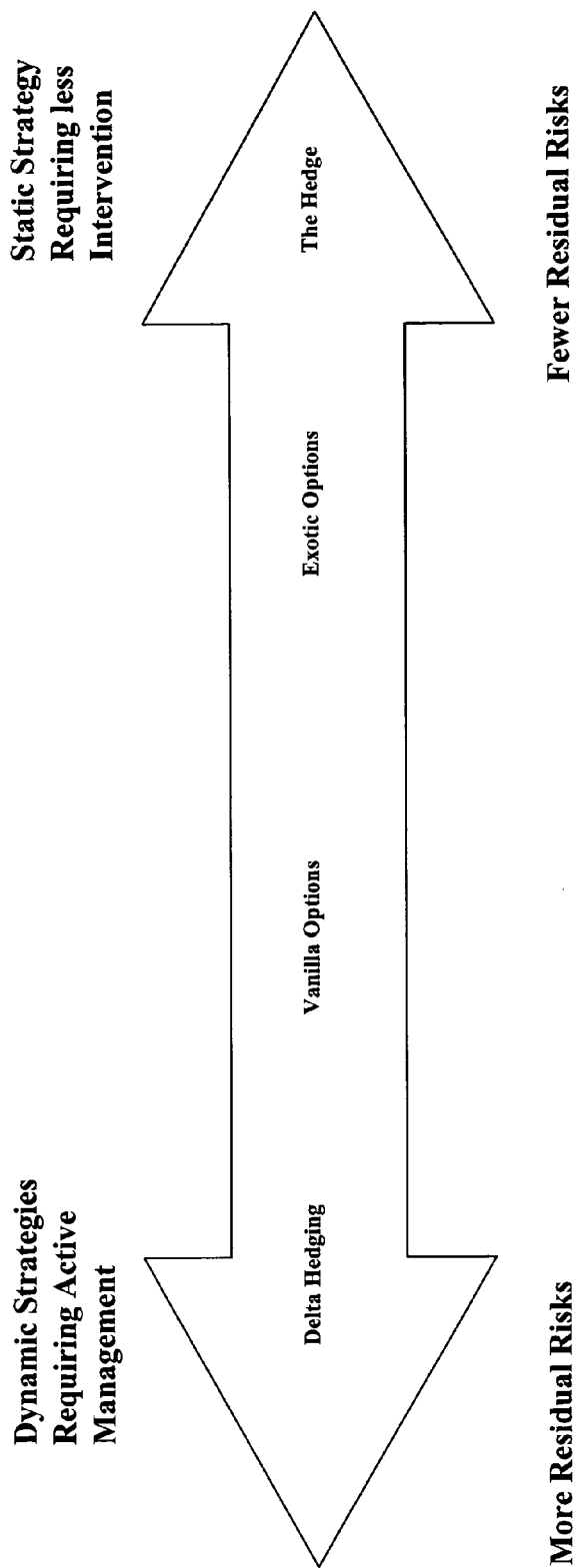
FIG. 1 depicts aspects of a customized static strategy and a dynamic strategy.

Various embodiments of the present invention are described below.

GMWB Customized Hedge

In one embodiment, a customized option is designed to pay any GMWB claims on a block of "idealized policies." The block of idealized policies serves as the underlying reference liability for a derivative contract. An investment bank ("Bank") pays the equivalent cash shortfall to the extent that the underlying portfolio value falls to zero and guaranteed payments are still required.

The idealized block of policies preferably is originated on a specified date, invested in market indices as specified in asset allocations, and performs with fixed/function-based actuarial assumptions for withdrawals, fees, resets, and lapses. Those skilled in the art will understand the precise meaning of "fixed/function-based"; roughly speaking, "fixed" means that the lapse rate, for example, is assumed to be 2% per year, while "function-based" would mean, for example, that the lapse rate is assumed to be a function of market conditions.

The idealized block is designed to exactly replicate the current policy mix of the insurance company ("Company"). The Company retains "basis risk" between market indices and actual fund performance. The Company also retains the risk that actual experience will differ from its actuarial assumptions.

The option is designed to match the life of the underlying block of policies (i.e., the term of the policies and the derivative are the same). The life of the block is the life of the last-ending policy in the block. As such, the life of the derivative is not determined and depends on the interplay of market performance with the initial set of assumptions. The hedge can be restructured/rebalanced over time if actuarial assumptions are revised.

The customized hedge incorporates the assumptions that Company makes in pricing the policy: (a) the unique policy mechanics are reflected in the structure; and (b) the dynamic lapse, withdrawal, and reset utilization functions expected by Company are imbedded in the hedge.

GAAP Accounting

Current accounting interpretation indicates that GMWBs are considered embedded equity derivatives that require bifurcation because the economic characteristics of the investment guarantee and the traditional variable annuity contract are not considered to be clearly and closely related. If that is the case then the GMWB option should be be carried at fair value with mark-to-market changes flowing through income.

Similarly, an option hedging strategy should also be carried at fair value with changes flowing through income.

Statutory Accounting

GMWBs are expected to follow the C-3 Phase II methodology for calculating RBC charges and statutory reserves (expected to be effective calendar year end 2005).

GMDB Reinsurance

Complexity Issue: Although the capital markets could provide the desired risk mitigation via dynamic hedging strategies, such approaches require time and expertise to execute and manage on an ongoing basis. In addition, it can be difficult to fully explain complex hedging strategies to outside constituencies, including rating agencies, regulators, and analysts.

In one embodiment, a Bank provides risk mitigation through a reinsurance contract as an alternative to a direct capital markets solution. Reinsurance allows an insurance company to transfer a portion of the risk in an efficient manner, without the difficulties of managing a capital market hedge. Potential rating agency and regulatory benefits may be realized due to risk reduction of the reinsurance but depend on the terms of the reinsurance contract.

Structure: A bank provides a reinsurance contract (though a reinsurer) that is designed to match the life of the underlying block of policies (i.e., the term of the policies and the derivative are the same), which provides the following protection for risks associated with guarantees embedded in variable annuities.

Equity Risk Transfer—This provides protection against equity market risk. Essentially, this transfers the equity derivative risk management and execution strategy with the reinsurer.

Equity and Actuarial Risk Transfer—In addition to the equity risk, this agreement offers protection against various actuarial risks (e.g., mortality).

Agreements are established to cap the amount of losses due to GMDB claims at a specified level per period for the life of the reinsurance contract.

The insurance company pays an upfront premium and/or ongoing charges per period.

Material Advantages: A customized reinsurance alternative provides several advantages, including:

Ease of Execution: By not hedging through the capital markets, the difficulties of modeling the business using option pricing strategies can be avoided. Also, reinsurance has been generally a more typical hedging mechanism for insurers.

Reduced Maintenance: A reinsurance contract represents a static hedge of the risk as opposed to a dynamic hedge. Therefore, constant monitoring and rebalancing is not necessary.

Communication to Constituents: Rating agencies and investors are focused on the degree to which a hedging strategy provides protection in adverse market conditions, as well as the ability of the company to manage the hedging strategy. To the extent a reinsurance alternative is better received by constituents due to its relative lack of complexity, it may garner more credit for risk mitigation.

Accounting Benefits—As risk transfer can be structured to include both market and actuarial risks, reinsurance accounting treatment may be achieved for GAAP (and STAT if desired). If that is the case then the asymmetrical accounting between the GMDB contract and the derivative hedge under GAAP would be removed.

Depending on the terms of the contract, reinsurance credit may be difficult to achieve on a GAAP accounting basis, although statutory reserve and capital benefits due to the economic risk reduction could be achieved.

Customized Reinsurance Transaction Design

To receive reinsurance accounting treatment under GAAP and STAT, both market and actuarial risks must be transferred to the reinsurer. However, 100% of all the risks need not be transferred to qualify for GAAP. Under GAAP reinsurance accounting, risk transfer occurs when the reinsurer has a significant likelihood of experiencing a significant loss. (Market practice dictates that the reinsurer must have a 10% chance of experiencing a 10% loss under the contract.)

Benefits of a reinsurance agreement will be realized through the reserve methodology proposed by the NAIC (i.e., C-3 Phase II). The amount of credit is dependent on the degree of risk transfer accomplished by the reinsurance agreement.

The following description describes an illustrative reinsurance agreement designed to transfer both market and a portion of actuarial risks of a GMDB variable annuity contract.

Illustrative Reinsurance Transaction

Figure 2:
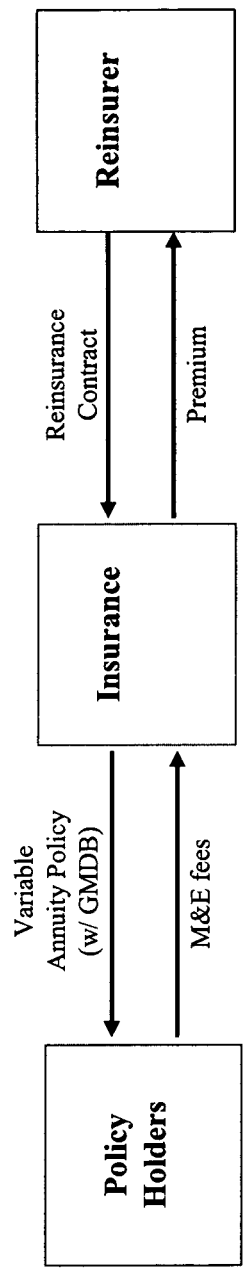
FIGS. 2 and 3 depict a preferred structural framework for a GMDB reinsurance transaction.

See FIG. 2 for a depiction of a structural framework. Insurance Company enters into either a quota share modified coinsurance agreement or a stop loss reinsurance agreement to transfer the GMDB risk of a select portion of variable annuity policies. (A detailed exemplary term sheet is provided in the Appendix below.) An upfront or ongoing premium is paid by the Insurance Company to the Reinsurer. The contract will transfer equity market risk, as well as actuarial risks (e.g., mortality).

Under the terms of the agreement, the Insurance Company will be reimbursed for a portion of the death benefit claims paid due to the GMDB feature.

Statutory Accounting and Regulatory SBC

Although the transaction described above might not qualify for statutory reinsurance, a credit could still be realized under C-3 Phase II.

The C-3 Phase II proposal is the anticipated methodology for calculating the RBC charge and statutory reserves that apply to GMDBs. The proposal is targeted to be effective at the end of 2005.

General Account RBC Requirements: (1) Run a set of stochastic scenarios and calculate the present value of the accumulated statutory surplus at each year end. The most negative present value becomes the capital requirement for that scenario. (2) Calculate the average present value for the bottom 10% of the scenarios. RBC requirements are equal to the average present value of the selected scenarios minus the statutory reserve actually held.

General Account Statutory Reserve: The statutory reserve is calculated in the same manner as the RBC charge, except the average present value will be calculated based on a larger subset of the worst scenarios (e.g., 15%, 20%, etc.; an appropriate percentile has yet to be determined).

As an alternative to scenario testing, the NAIC is developing a factor based approach to calculate the required capital for GMDBs. This method will not be available to insurers that previously used the scenario approach.

If the insurer enters into a reinsurance agreement to transfer the risk of GMDBs or a portion thereof, the RBC and statutory reserve calculation should include the cost of the reinsurance and its future benefits.

APPENDIX

Illustrative GMDB Reinsurance Transaction Description

Figure 3:
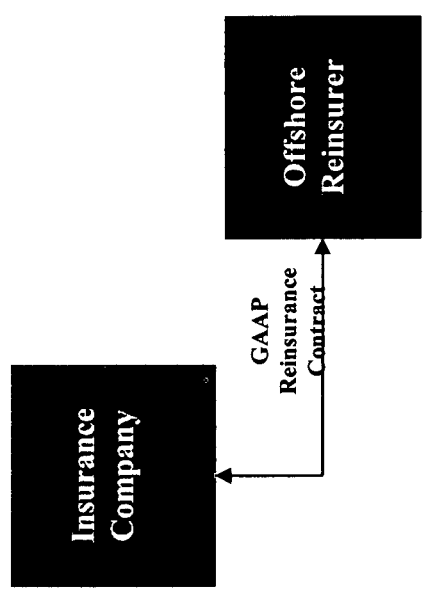

Transaction Overview (see FIG. 3):
Effective Date: [_____, 20XX]
Insurance Company: [Variable Annuity Writer]
Unaffiliated Reinsurer: [Offshore Re]
Type of Reinsurance: Modified Coinsurance, Experience-rated, net of existing reinsurance.
Quota Share Percentage: 100% initially (adjusted quarterly based on the lapse rate experience).
Business Covered: A select portion of the Company's variable annuity insurance policies that contain embedded Guaranteed Minimum Death Benefit (GMDB) features. (Includes associated Guaranteed Minimum Death Benefit Riders and benefits to underwritten variable annuities.)
Accounting Period: Quarterly
Term of Contract: The reinsurance will remain in-force until the natural expiry of the Business Covered. (Alternatively, the contract could be finite in duration.)
Special Purpose Reporting Statements: Comprehensive supplementary statements will be required on a retrospective basis to determine the account values by fund, market values, net amount at risk, and movements analysis showing changes during the period resulting from lapsation, partial surrenders and death on a [daily] basis for the preceding period.
Modco Reserves: The Modco Reserves are the basic statutory accounting measure of the policy-related liabilities being reinsured defined as the shortfall of policyholders' account value compared to their guaranteed value at a particular point in time.
Modco (Invested) Assets: Defined as the variable annuity policyholders' account value assets that appear in the Special Purpose Reporting Statements.
Initial Reinsurance Premium: [XX] bps paid to Offshore Re by the Variable Annuity Writer.
Benefits Paid: The Variable Annuity Writer will be reimbursed by Offshore Re for Benefits Paid due to GMDB claims as part of the death benefits.
Benefits Paid are defined as: $Q*[(a)-(b)]*$the Quota Share Percentage, with a floor of zero.
where "Q" is defined as the mortality rate,
-and-
where "(a)" is defined as the sum of all of the guaranteed values as applied to the Reinsured Policies, net of Existing Reinsurance (if any),
-and-
where "(b)" is defined as the sum of the actual account values, as applied to the Reinsured Policies, net of Existing Reinsurance (if any).

Lapse Rate Threshold: Defined as the level at which the average lapse rate over the life of the contract must exceed for the quota share percentage to remain unchanged. If the average lapse rate does fall below this amount, the Quota Share Percentage will be adjusted.

The Lapse Rate Threshold will be based on the expected lapse rates per period as determined and agreed upon by the Variable Annuity Writer and Offshore Re. The expected lapse rate schedule is as follows:

Change in Quota Share Percentage (Retro): The initial Quota Share Percentage will be [100%]. The Quota Share Percentage will vary depending on the actual lapse rate.

The Quota Share % per period is defined as: (a)*[min (1, b/c)]*d where "(a)" is defined as the initial Quota Share Percentage at the beginning of the reinsurance agreement,
-and-
where "(b)" is defined as the Guaranteed Account Value assuming lapses equal the Lapse Rate Threshold,
-and-
where "(c)" is defined as the Guaranteed Account Value using the actual lapse experience,
-and-
where "(d)" is defined as the Experience Refund Adjustment Rate.

Experience Refund Adjustment Rate: To the extent that lapses are in excess of the lapse rate threshold, the Variable Annuity Writer may be entitled to an experience refund. That refund will be paid through an increase in the Quota Share Percentage, which is used to calculate the payments from Offshore Re to the Variable Annuity Writer per period for any claims during that period.

Estimates: Utilized as appropriate where exact amounts are not available. Estimates are thereafter trued-up with late payment interest as applicable.

Setoff and Timing: Amounts owed by each party to the other are netted against one another and only the excess is due and payable following the end of each Accounting Period. Timing for payments has been tentatively set as within 60 days of the end of each Accounting Period.

Payments will be made in cash (no notes payable or letters of credit).

Accounting Treatment: The Transaction is intended to qualify for reinsurance accounting in accordance with GAAP Accounting. GAAP is governed by SFAS 113, Accounting and Reporting for Reinsurance of Short-Duration and Long-Duration Contracts.

Other Terms & Conditions: Many of the typical additional provisions found in a detailed reinsurance treaty, including: basic representations and warranties; arbitration and insolvency clauses; right to audit; restrictions on assignment, securitization, and retrocession; choice of [State] law; and confidentiality provisions.

Illustration:

An example is provided to illustrate the economic impact of the reinsurance agreement.

The assumptions are:
Initial Account Value $10 bn
Underlying funds Insurance Company Separate Accounts
Guaranteed Death Benefit Return of Premium (Vest after seven years)
Benefits Paid Formula Mortality*Net Amount at Risk (NAR) *Quota Share %
Expected Mortality Rate 1.5%
Quota Share % Formula Guaranteed Value under Lapse Rate Threshold
Guaranteed Value under Actual Lapse Experience
(not to exceed 100%)
Lapse Rate Schedule (as % of original contracts)—see TABLE 2 below:

TABLE 2

|  | Year 1 | Year 2 | Year 3 | Year 4 | Year 5 | Year 6 and up |
|---|---|---|---|---|---|---|
| Lapse Rate Threshold | 0% | 1% | 2% | 3% | 4% | 5% |

An Experience Refund could be incorporated to enable the primary insurer to recapture profits for favorable experience. (For simplicity, an Experience Refund formula was not incorporated into the example.)

The following analysis explains the benefits to be paid to the Variable Annuity Writer for year 7 experience assuming the underlying funds have dropped 10% from inception (does not incorporate premium paid to reinsurers). The calculations presented below assume actual lapses are equal to the predetermined lapse rate threshold.

TABLE 3

|  | Quota Share % | Benefits Paid | Primary Insurance Company Net Claim |
|---|---|---|---|
| Formula | Guaranteed Value * (100% − Lapse Rate Threshold) / Guaranteed Value * (100% − Actual Lapse Exp.) | Mortality * NAR * Quota Share % | Net Claim = GMDB Claim - Reinsurance Recoverable |
| Actual lapses = Lapse Rate Threshold | Lower of: 1. 100%, or 2. 100% = ($10 bn * (100% − 20%)) / ($10 bn * (100% − 20%)) | $12,000,000 = 1.5% * $800 mm * 100%, where: NAR = $800 mm = $10 bn * (100% − 20%) * 10% | 0 = $12,000,000 − $12,000,000 |

The following analysis (in TABLE 4) provides a comparison of the benefits to be paid to the Variable Annuity writer for year 7 experience, assuming the underlying funds have dropped 10% from inception (does not incorporate premium paid to reinsurer(s)) under the following lapse scenarios:

Actual lapses are twice the predetermined lapse rate threshold;
Actual lapses are 0%.

TABLE 4

|  | Quota Share % | Benefits Paid | Primary Insurance Company Net Claim |
|---|---|---|---|
| Actual lapses = 2x Lapse Rate Threshold | Lower of:<br>1. 100%, or<br>2. 133.3% = $\frac{(\$10\text{ bn} * (100\% - 20\%))}{(\$10\text{ bn} * (100\% - 40\%))}$ | $9,000,000 = 1.5% *<br>$600 mm * 100%<br>where:<br>NAR = $600 mm =<br>$10 bn * (100% − 40%) * 10% | 0 = $9,000,000 −<br>$9,000,000 |
| Actual lapses = 0% | Lower of:<br>1. 100%, or<br>2. 80% = $\frac{(\$10\text{ bn} * (100\% - 20\%))}{(\$10\text{ bn} * (100\% - 0\%))}$ | $12,000,000 = 1.5% *<br>$1 bn * 80%<br>where:<br>NAR = $1 bn =<br>$10 bn * (100% − 0%) * 10% | 3,000,000 =<br>$15,000,000 −<br>$12,000,000 |

While the present invention has been illustrated and described above regarding various embodiments, it is not intended to be limited to the details shown, since various modifications and structural changes may be made without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A system for providing one or more variable annuity policies with guaranteed minimum death benefits, comprising:
    one or more computer processors operable to calculate one or more reinsurance premiums for one or more reinsurance agreements related to said one or more variable annuity policies with guaranteed minimum death benefits;
    wherein said one or more reinsurance premiums are to be paid by an insurance company to a reinsurer,
    wherein said one or more reinsurance agreements transfer at least some equity market risk and at least some actuarial risk to said reinsurer from said insurance company,
    wherein said one or more reinsurance agreements cap potential loss due to said guaranteed minimum death benefits at a specified level per period for the term of each of said agreements,
    wherein at least one of said one or more reinsurance agreements comprises one or more terms related to a lapse rate threshold, and
    wherein at least one of said one or more reinsurance agreements is a quota share modified coinsurance agreement or a stop loss reinsurance agreement.

2. A system as in claim 1, wherein said premiums are to be paid upfront.

3. A system as in claim 1, wherein said premiums are to be paid on an ongoing basis.

4. A system as in claim 1, wherein said premiums are calculated based on pricing assumptions selected from the group consisting of: (a) mortality, as provided by said insurance company; (b) fees, as provided by said insurance company; (c) lapses, as provided by said insurance company (d) whether reinsurer assumes lapse risk; and (e) whether reinsurer assumes limited mortality risk.

* * * * *